US012523087B1

(12) United States Patent
Gingold et al.

(10) Patent No.: US 12,523,087 B1
(45) Date of Patent: Jan. 13, 2026

(54) APPARATUS AND COMPONENTS FOR MULTI-PANE WINDOW ASSEMBLY AND WINDOW INSERT

(71) Applicant: Intelligent Energy Group, LLC, New Rochelle, NY (US)

(72) Inventors: Eric Wallace Gingold, New York, NY (US); Darren Scott Levine, Larchmont, NY (US)

(73) Assignee: Intelligent Energy Group, LLC, New Rochelle, NY (US)

(*) Notice: Subject to any disclaimer, the term of this patent is extended or adjusted under 35 U.S.C. 154(b) by 0 days.

(21) Appl. No.: 18/404,350

(22) Filed: Jan. 4, 2024

Related U.S. Application Data

(63) Continuation of application No. 17/018,336, filed on Sep. 11, 2020, now Pat. No. 11,933,102.

(60) Provisional application No. 62/899,238, filed on Sep. 12, 2019.

(51) Int. Cl.
*E06B 3/663* (2006.01)
*E06B 3/66* (2006.01)

(52) U.S. Cl.
CPC ...... *E06B 3/66342* (2013.01); *E06B 3/66304* (2013.01); *E06B 3/66366* (2013.01); *E06B 3/6621* (2013.01)

(58) Field of Classification Search
CPC ............. E06B 3/66342; E06B 3/66304; E06B 3/66366; E06B 3/6621
See application file for complete search history.

(56) References Cited

U.S. PATENT DOCUMENTS 2,213,468 A 9/1940 Haven
2,618,819 A * 11/1952 Goodwillie ........... E06B 3/6621 52/717.03
2,756,467 A 7/1956 Oliver
3,128,509 A 4/1964 Ottmar
3,212,179 A 10/1965 Paul
3,348,351 A * 10/1967 Citarel ................ E06B 3/66328 52/204.593

(Continued)

FOREIGN PATENT DOCUMENTS

FR 996815 A * 9/1949

OTHER PUBLICATIONS

Lexan—Article Safety Data Sheet, Revision No. 3—Sabic.

*Primary Examiner* — Omar F Hijaz
(74) *Attorney, Agent, or Firm* — Tarolli, Sundheim, Covell & Tummino LLP

(57) ABSTRACT

According to some implementations, a multi-pane window assembly and a multi-pane window insert are described. The multi-pane window insert includes a first pane formed of polycarbonate resin thermoplastic material and a second pane formed of polycarbonate resin thermoplastic material that is separated from the first pane by a spacer. A planar surface of each the first pane and the second pane are oriented substantially parallel to one another. A framing structure is provided for housing the plural panes and a gasket is provided for sealing the multi-pane window to a frame on installation. The multi-pane window insert is configured to be installed on an interior surface of a pre-existing window frame to improve the thermal, acoustic, and light transmittance properties of a multi-pane window assembly.

14 Claims, 5 Drawing Sheets

(56) References Cited

U.S. PATENT DOCUMENTS 3,426,493 A * 2/1969 Finn .......................... E06B 1/56 52/204.591
3,669,785 A * 6/1972 Bowser et al. ..... E06B 3/66328 156/306.9
3,789,191 A * 1/1974 Spindler ........... B32B 17/10174 219/544
3,834,097 A * 9/1974 Smits .................... E06B 3/6621 52/786.13
3,932,971 A 1/1976 Day
4,030,263 A * 6/1977 Lacombe .............. E06B 3/6621 52/786.13
4,042,736 A * 8/1977 Flint ................... E06B 3/66342 52/786.13
4,151,696 A * 5/1979 Knights .................... E06B 3/56 264/261
4,321,777 A * 3/1982 Sauret ............... B32B 17/10302 89/36.02
4,622,249 A * 11/1986 Bowser ................... E06B 3/677 52/786.13
4,808,452 A * 2/1989 McShane ............... C08G 75/14 428/419
4,835,927 A 6/1989 Michlovic
4,942,704 A * 7/1990 King ....................... E06B 3/677 52/204.593
4,950,344 A 8/1990 Glover et al.
4,951,927 A 8/1990 Johnston et al.
4,993,187 A 2/1991 Schweiss et al.
4,994,309 A 2/1991 Reichert et al.
5,027,574 A 7/1991 Philip
5,106,663 A * 4/1992 Box .................... E06B 3/66342 52/786.13
5,131,194 A * 7/1992 Anderson ............. E06B 3/6707 52/204.597
5,398,446 A * 3/1995 Kunert .................. E06B 3/6715 49/153
5,568,714 A 10/1996 Peterson
5,616,415 A * 4/1997 Lafond ............... E06B 3/66328 52/786.13
6,823,643 B2 11/2004 France
7,856,791 B2 12/2010 Rosskamp et al.
2002/0069597 A1 6/2002 Gorder
2003/0041536 A1* 3/2003 Tortorella, Jr. ........... E06B 3/20 52/204.5
2005/0008797 A1 1/2005 Bayha et al.
2005/0166491 A1 8/2005 Hornung et al.
2008/0132647 A1 6/2008 Ajbani et al.
2008/0166570 A1* 7/2008 Cooper ................. E06B 3/6612 428/426
2008/0190070 A1 8/2008 Duncan et al.
2010/0000181 A1* 1/2010 Duncan ................... B32B 17/10 49/506
2011/0036027 A1* 2/2011 Back ..................... E06B 3/6775 52/204.593
2011/0296771 A1* 12/2011 Miller ................. B32B 37/1284 52/204.593

* cited by examiner

APPARATUS AND COMPONENTS FOR MULTI-PANE WINDOW ASSEMBLY AND WINDOW INSERT

CROSS REFERENCE TO RELATED APPLICATIONS

This application is a continuation of U.S. application Ser. No. 17/018,336, filed on Sep. 11, 2020, which claims the benefit of priority under 35 U.S.C. § 119 to U.S. Provisional Application No. 62/899,238 filed on Sep. 12, 2019. The contents of each of the foregoing applications is incorporated by reference herein in their entirety.

FIELD

The present invention relates to multi-pane insulating windows, and more particularly to multi-pane insulating window inserts that are impact resistant.

BACKGROUND

Glass panes and their associated mullions utilized for windows, doors, and other structures are a major source of unwanted leakage of air, resulting in undesired changes in temperature or increased energy consumption to maintain interior spaces at desired temperature levels. The moderation of unwanted energy losses on account of these structures has become of increasing importance. In addition, it is generally desirable to provide sound wave insulation to reduce exterior sounds from disrupting interior spaces in residences or commercial environments.

A common method of reducing hot or cold air and sound transfer through windows has been through the use of multi-pane (i.e., double or triple glazed windows). These windows make use of two panes of glass that are attached together by a spacer, for example as described in U.S. Pat. Nos. 2,756,467, 3,128,509, 3,212,179 and 3,932,971, each of which are incorporated by reference herein in their entirety. A gas, such as dry air, argon, or nitrogen, can be utilized to fill the space between the two panes to provide both a temperature and sound insulating property for the assembly. The assembled multi-pane window, including the spacer, may be hermetically scaled.

Various conventional fabrication methods are utilized for forming of a multi-pane glass window, including for example, utilization of a sash having an integrated spacer. These fabrication techniques and sash structures are described, for example, in U.S. Patent Publication No. 2008/0190070A1 and U.S. Pat. No. 6,823,643, each of which are incorporated herein by reference in their entirety.

The panes may also be pressed or pulled against an adhesive sealant on an integrated sash structure, for example, as described in U.S. Patent Publication No. 2005/0166491A1, which is incorporated by reference herein in its entirety.

Although utilization of multi-pane windows partially reduces the energy and sound transfer through a window, the use of two panes of glass substantially increases the weight of the window. The conventional use of multi-pane glass windows to produce such results requires the use of thick glass for each pane (from about ⅛$^{th}$ inches to about ½ inches). As such, a fabricated multi-pane glass window can weigh up to six pounds per square foot. Extrapolating to an average commercial window having for example 6-feet by 4-feet dimensions, the corresponding single multi-pane glass window weight can reach 200 pounds or more.

The increased weight in windows is normally unwanted because of the need for heavier frames and sashes, heavier mounting hardware, and more rigid sash materials. Furthermore, for retrofit installations, adding many such windows in an older building may not be possible due to weight restrictions of architectural supports, and may require architectural redesign of support structures to allow for the upgrade or replacement of windows.

BRIEF SUMMARY

According to some implementations, a multi-pane window insert is described. The multi-pane window may be provided as a thermal optical window insert for installation into an existing window frame.

In some implementations, the multi-pane window is provided as a clear, double paned polycarbonate window insert with an air-tight gasket that fits tightly into the interior of an existing window opening.

According to some implementations, a multi-pane window is described that includes a first pane formed of polycarbonate resin thermoplastic material and a second pane formed of polycarbonate resin thermoplastic material that is separated from the first pane by a spacer frame. A planar surface of each the first pane and the second pane are oriented substantially parallel to one another. According to some implementations, the polycarbonate resin thermoplastic material is Lexan™.

According to some implementations, the multi-pane window includes a sash retaining the first pane and the second pane and defining the spacer. The first pane is oriented on an exterior facing side of the sash and the second pane is oriented on an interior facing side of the spacer frame.

According to some implementations, the multi-pane window includes a gasket comprised of a flexible material. The gasket is configured to provide a seal for the multi-pane window when installed in a window frame. According to some implementations, the gasket is comprised of a synthetic rubber.

According to some implementations, the gasket comprises a first protrusion on the exterior facing side, a second protrusion on the interior facing side, and a third protrusion between the first and second protrusions.

According to some implementations, the first and second protrusions are elongated relative to the third protrusion.

According to some implementations, the second protrusion is elongated relative to the first protrusion. According to some implementations, the first, second and third protrusions are shaped as fins.

According to some implementations, the first and second protrusions are shaped as fins and the third protrusion is shaped as a rounded nib.

According to some implementations, the first pane is separated from the second pane by a distance that is in the range of approximately ⅛$^{th}$ inches to approximately 1.5 inches.

According to some implementations, the gasket has a flat surface that is adhered to the perimeter of the multi-pane window insert and a second surface having a substantially convex shape that is configured to abut the interior surface of the preformed window frame.

According to some implementations, the spacer frame is a clear polycarbonate. According to some implementations, the spacer frame is a color-tinted polycarbonate.

According to some implementations, a multi-pane window assembly is described. The multi-pane window assembly includes a multi-pane window having a plurality of glass panes and a preformed window frame, and a multi-pane window insert. The multi-pane window insert includes a first pane formed of polycarbonate resin thermoplastic material, a second pane formed of polycarbonate resin thermoplastic material that is separated from and the first pane by a spacer, wherein a planar surface of each the first pane and the second pane are oriented substantially parallel to one another, a spacer frame retaining the first pane and the second pane and defining the spacer, wherein the first pane is oriented on a first side of the spacer frame and the second pane is oriented on a second side of the spacer frame, wherein the spacer frame is formed of a polycarbonate resin thermoplastic. The spacer frame defines the perimeter of the window insert. The multi-pane window insert includes a gasket comprised of a flexible material and formed on the exterior perimeter surfaces of the multi-pane window insert. The gasket is configured to provide a seal for the multi-pane window insert when installed in a preformed window frame. The multi-pane window insert is configured to be installed on an interior surface of the preformed window frame.

DETAILED DESCRIPTION

Figure 1:
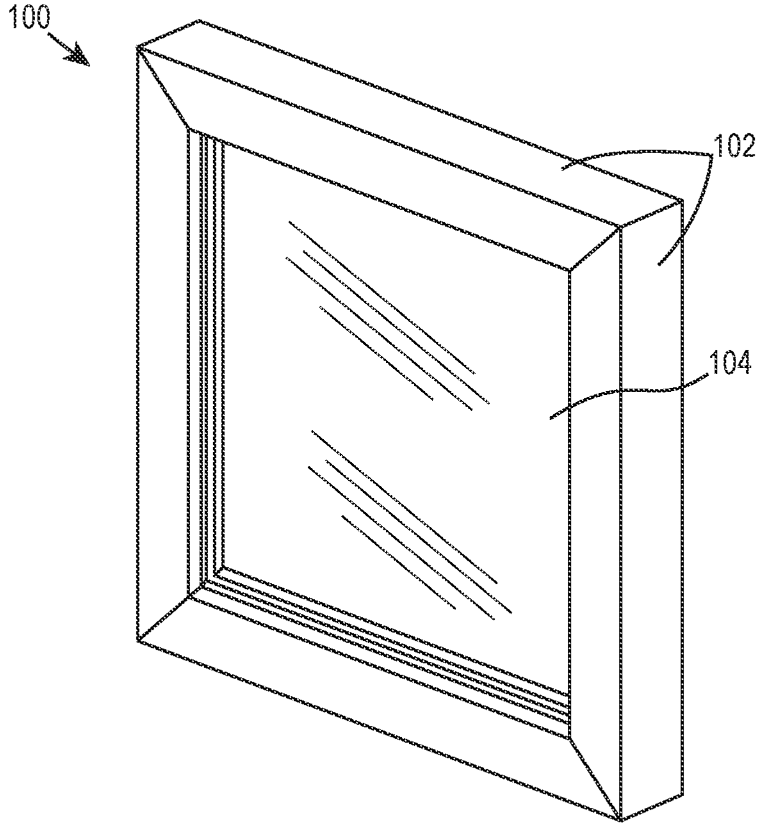
FIG. 1 illustrates a perspective view of a multi-pane window according to some implementations.

The following detailed description of certain implementations presents various descriptions of specific implementations of the invention. However, the invention can be embodied in a multitude of different ways as defined and covered by the claims. In this description, reference is made to the drawings where like reference numerals indicate identical or functionally similar elements.

According to some implementations, a multi-pane window is described. The multi-pane window may be provided as an insert for installation into an existing window frame or may be provided as a new installation window or other viewing opening. In some implementations, the multi-pane window is provided as a clear, double-paned polycarbonate window insert with an air-tight gasket that fits into the interior of an existing window frame or opening.

According to some implementations, the multi-pane window includes a first pane formed of polycarbonate resin thermoplastic material and a second pane formed of polycarbonate resin thermoplastic material that is separated from the first pane by a spacer. A planar surface of each the first pane and the second pane are oriented substantially parallel to one another. According to some implementations, the multi-pane window includes an interior spacer frame for retaining the first pane and the second pane and defining the spacer. According to some implementations, the interior spacer frame may be configured as a sash or skeleton. The first pane is oriented on an exterior facing side of the interior spacer frame, and the second pane is oriented on an interior facing side of the interior spacer frame.

Aspects of a multi-plane window as disclosed herein will be described with reference to FIGS. 1-4 which illustrate non-limiting examples of a multi-pane window for purposes of reference in providing descriptions of the various components. It will be readily understood that the invention described herein may be implemented in other configurations of windows, door, skylights, or other structure which provide for transparent viewing of an external area from an interior enclosed or partially enclosed space.

Figure 2:
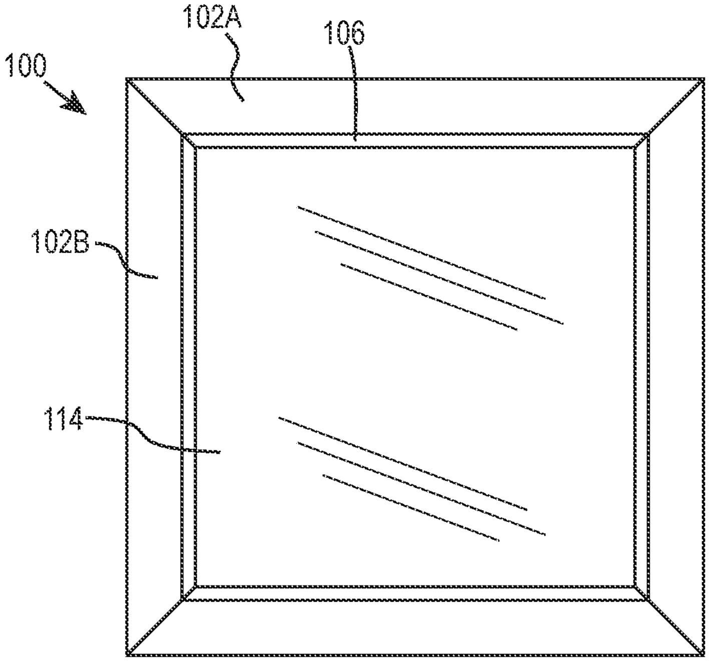
FIG. 2 illustrates a side view of the multi-pane window of FIG. 1.

FIG. 1 illustrates a perspective view of a multi-pane window 100 according to some implementations. The multi-pane window 100 includes, a framing structure 102, such as a sash, and a viewing area 104. FIG. 2 illustrates a side view of the multi-pane window 100 of FIG. 1. As shown in FIG. 2, the multi-pane window includes a top area of the framing structure, such as sash area 102A and a side area of the framing structure, such as sash area 102B which are fit to one another at corner sections in order to provide the framing structure 102. The framing structure 102 also includes a spacer 106 for mounting the panes as will be described in greater detail with reference to FIG. 3. The multi-pane window includes multiple transparent panes 114 which provide for sound and temperature insulation upon installation.

Figure 3:
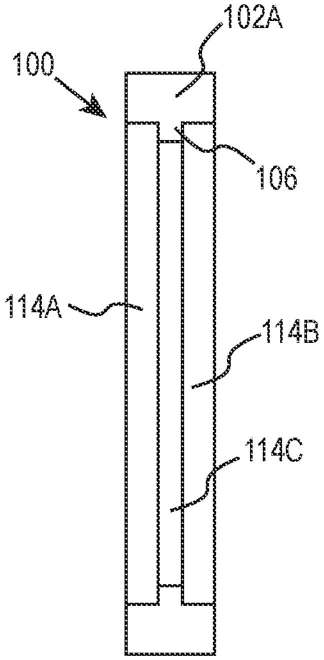
FIG. 3 illustrates a cross-section view of the multi-pane window of FIGS. 1 and 2.

FIG. 3 illustrates a cross-section view of the multi-pane window 100 of FIGS. 1 and 2. As illustrated, the multi-pane window 100 includes the upper area of the framing structure 102A having spacer 106 which is formed as a protrusion from the body of the framing structure 102A. A first pane 114A is on an interior surface of the multi-pane window 100 and mounted in the framing structure 102 and abutted to the spacer 106. A second pane 114B is on an exterior surface of the multi-pane window 100 and mounted in the framing structure 102 and abutted to the opposite side of the spacer 106 from the first pane 114A. The first and second panes 114A may be secured to the framing structure 102 utilizing tape adhesive, adhesive beads, or by way of mechanical securing mechanisms. For example, the framing structure 102 may include a securing flange that can be pressed and adhered to the edges of the first and second panes 114A and 114B.

According to some implementations, the first and second panes 114A and 114B are formed of a polycarbonate material. The polycarbonate has optical clarity and comes in various thicknesses depending on orientation and size of the multi-pane window 100. For example, thicknesses may be 0.060 inches, 0.118 inches or 0.150 inches, or other thickness within the range of 0.025 inches to about 0.3 inches.

In some implementations, the first and second panes 114A and 114B are formed of Lexan™. Properties of the polycarbonate, such as Lexan™ may correspond to those as outlined in the appended Annex A.

Figure 4:
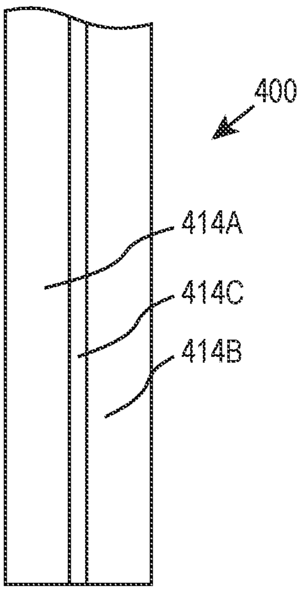
FIG. 4 illustrates a cross-section partial exploded view of the multi-pane window of FIG. 3.

FIG. 4 illustrates a cross-section partial exploded view of the multi-pane window 400 which corresponds to the multi-pane window 100 of FIG. 3. As shown, the first pane 414A and the second pane 414B are uniformly separated by a gap 414C along the substantially parallel interior surfaces of the first and second panes 414A and 414B. The gap 414C may be filled with a gas, such as dry air, argon, or nitrogen, which can be utilized to fill the space between the two panes to provide both a temperature and sound insulating property for the assembly.

A window insert may be also be fabricated utilizing the structures described herein for implementation in residential or commercial windows. For example, strengthening of existing windows utilizing polycarbonate sheets or a window insert may be performed by incorporating the multi-pane window insert as described herein into existing window frame structures.

According to some implementations, the multi-pane window inserts may be placed into existing window surrounds, in front of the existing window on the interior surface, creating a barrier from the outside elements and the building's interior. In some implementations, the multi-pane window insert includes a dual pane polycarbonate insert with an inner frame of like material held together with constructive grade adhesives or very high bond tape and wrapped with a flexible (e.g., EPDM rubber) gasket around its perimeter. Each insert is cut and manufactured for the specific window opening it is installed into to ensure proper sealing.

In one example manufacturing process, the inner frame (e.g., a spacer frame) made of polycarbonate or acrylic is cut at forty-five degree angles on each end to a specific size for the window opening it is being built for. Two pieces for the width and two pieces for the height are cut to size. Each of the four pieces are covered with adhesive or very high bond tape applied to both of the cut sides.

A gasket is then cut on forty-five degree angles on each end to substantially correspond to the edges of the window insert frame. A factory heat applied tape strip may be applied to the inside of the cut gasket. Two pieces are cut to cover the width of the preformed window frame and two pieces are cut to substantially match the height of the preformed window frame. The four corners may be adhered together in their proper width and height positions.

The spacer frame is then adhered to a sheet of polycarbonate (e.g., Lexan) in order to match the dimensions of the preformed window frame. The sheet of polycarbonate is cut such that the edges of the polycarbonate substantially correspond to the spacer frame edges to form the first pane of the multi-pane window insert. A second sheet of polycarbonate is adhered to the opposing surface and cut to substantially correspond to the spacer frame edges to form the second pane of the multi-pane window insert.

According to some implementations, a protective plastic is utilized on the surfaces of the polycarbonate sheets during the manufacturing process. The protective plastic may be removed from the interior facing surfaces of the polycarbonate sheets prior to adhering the sheets to the spacer frame. The protective plastic on the exterior surfaces may then be removed during installation of the multi-pane window insert in the preformed window frame.

According to some implementations of the assembly process, taped or adhered areas may be pressure rolled to ensure tape adhesion on both sides of the completed insert. The excess polycarbonate may be removed using a router with a specific roller bearing head to remove the polycarbonate and create a substantially flush surface relative to the spacer frame. According to some implementations, edges of the assembled multi-pane window insert are deburred to create a smooth polycarbonate edge. The outer perimeter is then cleaned to create a proper surface for adhesion to the gasket. According to some implementations, the gasket may be installed onto the outer perimeter of the multi-pane window insert with factory applied heat tape flush with the front and back of the insert.

Window types vary in many ways and dimensions. This is particularly true for pre-existing window installations that may have shifted, settled, or warped over time in older construction. For example, some pre-formed window frames may require an angle frame to be installed into the window surround, producing a landing for the insert to create a proper seal. Other installations may require some adaptation of the shape and size of the insert's sides and corners in order to create a more feasible size of insert depending on the size and location within the building the existing window is located.

The multi-pane window inserts described herein may be formed in any shape or configuration (e.g., Arched, Round, Trapezoid, Hexagon, etc.) to match the pre-existing window frame. Due to the light weight and flexibility of the polycarbonate sheets, each of the corners of the multi-pane window insert may also be formed in a different shape or dimensions in order to match the dimensions of the preformed window frame.

According to some implementations, the polycarbonate sheet is Lexan polycarbonate, having substantially the following attributes as shown below in Tables 1-4.

TABLE 1

Physical Properties

| Property | Test Method | Units | Value |
|---|---|---|---|
| Physical | | | |
| Specific Gravity | ASTM D792 | — | 1.20 |
| Refractive Index @ 77° F. | ASTM D542A | — | 1.586 |
| Light Transmission (Average at 0.118") | ASTM D1003 | % | 86 |
| Initial Haze | | HU | <1 |
| Rockwell Hardness (M scale) | ASTM D785 | — | 70 |
| Rockwell Hardness (R scale) | ASTM D785 | | 118 |
| Taber @ 100 cycles | ASTM D1044 (ANSI ZI26.1) | % haze | 10 |
| Water Absorption, 24 hrs | ASTM D570 | % | 0.15 |
| Water Absorption, Equilibrium | @ 73° F. | % | 0.35 |

TABLE 2

Mechanical Properties

| | | | |
|---|---|---|---|
| Mechanical | | | |
| Tensile Strength, Yield | ASTM D638 | psi | 9,500 |
| Tensile Modulus | ASTM D638 | psi | 345,000 |
| Flexural Strength | ASTM D790 | psi | 13,500 |
| Flexural Modulus | ASTM D790 | psi | 345,000 |
| Compressive Strength | ASTM D695 | psi | 12,500 |
| Compressive Modulus | ASTM D695 | psi | 345,000 |
| Poisson's Ratio | ASTM E132 | — | 0.37 |
| Izod Impact Strength Notched @ 0.118" | ASTM D256A | ft-lbs/in | 12-16 |
| Unnotched @ 0.118" | | | 60 (no failure) |
| Shear Strength @ Yield | ASTM D732 | psi | 6,000 |
| Shear Modulus | ASTM D732 | sd | 114,000 |

TABLE 3

| Thermal Properties | | | |
|---|---|---|---|
| Thermal | | | |
| Coefficient of Thermal Expansion | ASTM D696 | in/in/° F. | $3.75 \times 10^{-5}$ |
| Coefficient of Thermal Conductivity | ASTM C177 | Btu · in/hr · ft2 · ° F. | 1.35 |
| Specific Heat @ 40° C. | ASTM C351 | BTU/lb-° F. | 0.30 |
| Heat Deflection Temperature @ 264 psi | ASTM D648 | ° F. | 270 |
| @ 66 psi | | | 280 |
| Brittle Temperature (on resin) | ASTM D746 | ° F. | −211 |

TABLE 4

| Electrical Properties | | | |
|---|---|---|---|
| Electrical | | | |
| Dielectric Constant @ 60 Hz | ASTM D150 | — | 3.17 |
| Volume Resistivity | ASTM D257 | Ohm-cm | 8.2 × 1016 |
| Dissipation Factor (@60 Hz) also known as Power Factor | ASTM D150 | | 0.0009 |

According to some implementations, the spacer frame may be a clear polycarbonate (e.g., Lexan) of the same material as the panes of the multi-pane window insert. In other implementations, the spacer frame may be tinted to any desired color to provide for an aesthetic or decorative appeal.

Figure 5:
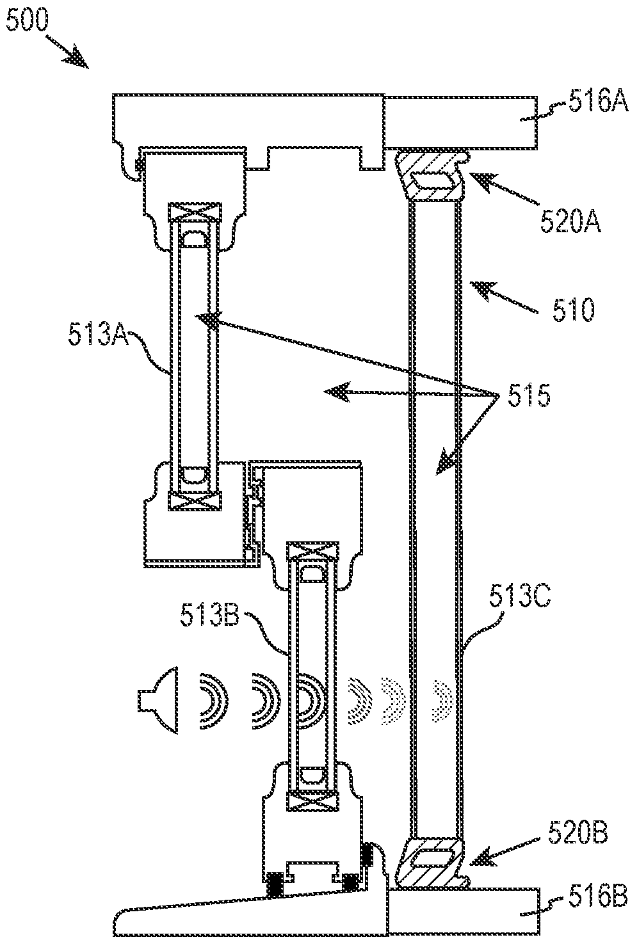
FIG. 5 illustrates a cross-section view of an example multi-pane window installation according to some implementations.

FIG. 5 illustrates a cross-section view of an example multi-pane window assembly 500 according to some implementations. As illustrated in FIG. 5, a multi-pane window assembly 500 may be assembled utilizing as a retrofit multi-pane window insert 510 into an existing window structure by inserting the multi-pane window in the existing framing abutted against or secured to the window frame jambs 516A, 516B. As shown in FIG. 5, the pre-existing window structure is a sashed assembly having surfaces 513A and 513B as the external facing surfaces of the window. A window insert 510 includes gaskets 520A, 520B for providing an airtight seal between the window insert 510 and the window frame jamb 516A, 516B of the pre-existing window frame.

Utilizing the window insert 510, multiple insulating air spaces 515 can be provided which drastically reduce heat loss, while increasing comfort levels by keeping conditioned air separated from existing windows. For example, a single pane may be retrofitted to become a double or triple pane window assembly 500 using the window insert 510.

Figure 6:
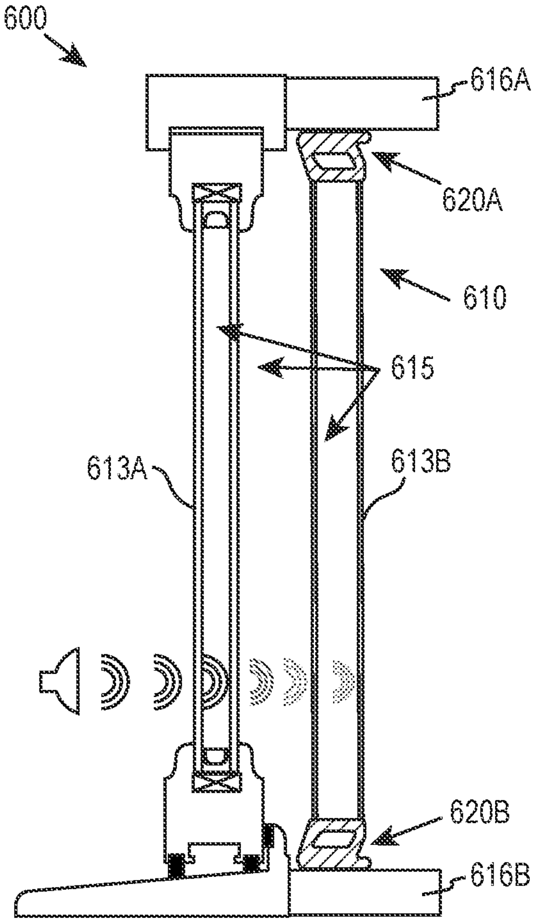
FIG. 6 illustrates a cross-section view of an example multi-pane window installation according to some implementations.

FIG. 6 illustrates a cross-section view of an example multi-pane window assembly 600 according to some implementations. As illustrated in FIG. 6, a multi-pane window assembly 600 may be assembled utilizing as a retrofit multi-pane window insert 610 into an existing window structure by inserting the multi-pane window in the existing framing abutted against or secured to the window frame jambs 616A, 616B. As shown in FIG. 6, the pre-existing window structure is a single window assembly having surface 613A as the external facing surface of the window. A window insert 610 includes gaskets 620A, 620B for providing an airtight seal between the window insert 610 and the window frame jamb 616A, 616B of the pre-existing window frame. While not illustrated, in some embodiments a pre-existing window pane may have associated mullions that are also susceptible to air transfer leakage. The multi-pane window insert described herein may be applied to remedy these issues when inserted into a pre-existing window frame.

Utilizing the multi-pane constructions described herein, a multi-pane window assembly can be formed which insulates the opening by stopping the permeating temperatures that glass cannot. During simulation tests, the window insert slows the infiltration of solar heat gain and blocks 99% of the ultraviolet (UV) radiation. When applied to a single pane window, it can improve the U-Factor by as much as 120% and the Solar Heat Gain Coefficient (SHGC) by up to approximately 10%. The multi-pane window described herein may stop 99% of the air infiltration caused by drafty windows. It also has sound remediation qualities and can reduce noise by as much as 7 to 10 decibels.

The multi-pane window insert costs 70-85% less than a replacement window with the same insulation value that is made of glass. Because of its unique gasket system, installation is simple, quick and without the inconvenience of traditional window installations. In addition, the multi-pane window insert can be fabricated on-site, and can be adapted easily to match the unique structure of a retrofit installation for any existing pre-formed window frame. Since the multi-pane window insert is installed at the interior surface of the pre-existing window frame, the external facade of the installation space is undisturbed. This is particularly advantageous for landmark commercial buildings requiring permits and particular architectural considerations for any changes to the external facade.

Further, the multi-pane window weighs up to 90% less than a correspondingly sized conventional glass window while allowing the heating and air conditioning systems to work less to maintain the desired temperatures within a residence or other building. The disclosed multi-pane window allows more efficient climate control by eliminating the hot and cold air from entering or escaping. The reduced weight also allows for simpler installation and reduced costs for transporting the windows to the installation site, without requiring heavy equipment for mounting the windows in place. The multi-pane window insert assembly described herein also drastically improves the impact strength of the window installation, exhibiting up to 50× the impact strength of tempered glass, up to 100× the impact strength of laminated glass, and up to 15× the impact of an acrylic construction window.

Simulations performed utilizing the multi-pane window insert relative to other traditional window installations illustrate the improvement in both the rate of heat transfer (e.g., U-Factor) as well as solar radiation transmission (e.g., solar heat gain coefficient SHGC) in comparing a glass only window installation to a glass window with the multi-pane window insert (denoted as "Glass With IEG INS") as shown in Tables 5 and 6 below:

TABLE 5

| U-Factor Improvement U-Factor (btu/h-ft2-F.) | | | |
|---|---|---|---|
| Glass Type | Glass Only | Glass With IEG INS | U-Factor % Improvement |
| Single Pane Clear | 1.04 | 0.47 | 121% |
| Double Pane Clear | 0.48 | 0.23 | 109% |
| Double Pane Clear (Low-E) | 0.25 | 0.13 | 56% |
| Single Pane Tinted | 1.04 | 0.30 | 244% |
| Double Pane Tinted | 0.45 | 0.22 | 105% |
| Double Pane Tinted (Low-E) | 0.27 | 0.16 | 65% |

TABLE 6

| SHGC Improvement Solar Heat Gain Co-efficiency (SHGC) | | | |
|---|---|---|---|
| Glass Type | Glass Only | Glass With IEG INS | SHGC-% Improvement |
| Single Pane Clear | 0.87 | 0.78 | 11% |
| Double Pane Clear | 0.78 | 0.65 | 17% |

TABLE 6-continued

| SHGC Improvement Solar Heat Gain Co-efficiency (SHGC) | | | |
|---|---|---|---|
| Glass Type | Glass Only | Glass With IEG INS | SHGC-% Improvement |
| Double Pane Clear (Low-E) | 0.50 | 0.43 | 14% |
| Single Pane Tinted | 0.70 | 0.54 | 23% |
| Double Pane Tinted | 0.66 | 0.51 | 23% |
| Double Pane Tinted (Low-E) | 0.55 | 0.43 | 22% |

Additional simulations were performed utilizing specific configurations of multi-pane window installations and installation of a multi-pane window insert as described herein in order to form a multi-pane window assembly. These simulations measure and show significant improvements in Air Leakage (AL), Energy Performance Index for Cooling (EPc), Energy Performance Index for Heating (Eph), U-Factor, solar heat gain coefficient (SHGC), air leakage (AL), and visible transmittance (VT).

| | |
|---|---|
| SERIES/MODEL | Thermal Optic Insert |
| PRODUCT TYPE | Fixed, 4-Sided |
| ATTACHMENT TYPE | Window Panel |
| DESCRIPTION | Double Glazed Interior Window Insert |
| BASE WINDOW | BW-B |

BASE WINDOW GLAZING DESCRIPTION

| | | | | | |
|---|---|---|---|---|---|
| | OUTER PANE | MIDDLE PANE | INNER PANE | GAP SIZE | OVERALL |
| All | ⅛" | N/A | ⅛" | ½" | ¾" |
| | OUTER PANE | MIDDLE PANE | INNER PANE | | |
| All | Clear | N/A | Clear | | |
| | SPACER TYPE | PRIMARY SEAL | SECONDARY SEAL | CODE | |
| All | Aluminum Spacer | Butyl | Butyl | A1-D | |

ATTACHMENT DESCRIPTION

| | | | | | |
|---|---|---|---|---|---|
| | TYPE | CODE | POSITION | MOUNT | GAP |
| | Window Panel | WP | Interior | Inside | 1.500" |
| | OUTER PANE | MIDDLE PANE | INNER PANE | GAP SIZE | OVERALL |
| 1 | ⅛" | N/A | ⅛" | 0.516" | ¾" |
| | OUTER PANE | MIDDLE PANE | INNER PANE | | |
| 1 | Clear | N/A | Clear | | |
| | SPACER TYPE | PRIMARY SEAL | SECONDARY SEAL | CODE | |
| All | Lexan | Foam Tape | N/A | Other | |

Example 1—Pre-Formed Window and Insert Properties

TOTAL PRODUCT CALCULATIONS (Thermal Optic Insert)

| | | | Total Product Performance | | | | | |
|---|---|---|---|---|---|---|---|---|
| Option Number | Description | AERC Baseline Window Type | U-Value (BTU/h · ft² · F) | SHGC | VT | AL (cfm/ft²) | EPc | EPh |
| 1 | Double Glazed Interior Window Insert | BW-B | 0.23 | 0.49 | 0.50 | 0.01 | 29 | 105 |

Example 1—Multi-Pane Window Insert Assembly Performance

| | |
|---|---|
| SERIES/MODEL | Thermal Optic Insert |
| PRODUCT TYPE | Fixed, 4-Sided |
| ATTACHMENT TYPE | Window Panel |
| DESCRIPTION | Double Glazed Interior Window Insert |
| BASE WINDOW | BW-D |

| BASE WINDOW GLAZING DESCRIPTION | | | | | |
|---|---|---|---|---|---|
| | OUTER PANE | MIDDLE PANE | INNER PANE | GAP SIZE | OVERALL |
| All | ¼" | N/A | N/A | N/A | ¼" |
| | OUTER PANE | MIDDLE PANE | INNER PANE | | |
| All | Clear | N/A | N/A | | |
| | SPACER TYPE | PRIMARY SEAL | SECONDARY SEAL | CODE | |
| All | No Spacer | N/A | N/A | N | |

| ATTACHMENT DESCRIPTION | | | | | |
|---|---|---|---|---|---|
| | TYPE | CODE | POSITION | MOUNT | GAP |
| | Window Panel | WP | Interior | Inside | 1.500" |
| | OUTER PANE | MIDDLE PANE | INNER PANE | GAP SIZE | OVERALL |
| All | ⅛" | N/A | ⅛" | 0.516" | ¾" |
| | OUTER PANE | MIDDLE PANE | INNER PANE | | |
| All | Clear | N/A | Clear | | |
| | SPACER TYPE | PRIMARY SEAL | SECONDARY SEAL | CODE | |
| All | Lexan | Foam Tape | N/A | Other | |

Example 2—Pre-Formed Window and Insert Properties

TOTAL PRODUCT CALCULATIONS (Thermal Optic Insert)

| Option Number | Description | AERC Baseline Window Type | Total Product Performance: U-Value (BTU/h · $ft^2$ · F) | SHGC | VT | AL (cfm/$ft^2$) | EPc | EPh |
|---|---|---|---|---|---|---|---|---|
| 1 | Double Glazed Interior Window Insert | BW-D | 0.41 | 0.53 | 0.56 | 0.01 | 26 | 76 |

Example 2—Multi-Pane Window Insert Assembly Performance

| | |
|---|---|
| SERIES/MODEL | Thermal Optic Insert |
| PRODUCT TYPE | Fixed, 4-Sided |
| ATTACHMENT TYPE | Window Panel |
| DESCRIPTION | Double Glazed Interior Window Insert |
| BASE WINDOW | BW-E |

| BASE WINDOW GLAZING DESCRIPTION | | | | | |
|---|---|---|---|---|---|
| | OUTER PANE | MIDDLE PANE | INNER PANE | GAP SIZE | OVERALL |
| All | ⅛" | N/A | ⅛" | ½" | ¾" |
| | OUTER PANE | MIDDLE PANE | INNER PANE | | |
| All | Clear | N/A | Clear | | |
| | SPACER TYPE | PRIMARY SEAL | SECONDARY SEAL | CODE | |
| All | Aluminum Spacer | Butyl | Butyl | A1-D | |

| ATTACHMENT DESCRIPTION | | | | | |
|---|---|---|---|---|---|
| | TYPE | CODE | POSITION | MOUNT | GAP |
| | Window Panel | WP | Interior | Inside | 1.500" |
| | OUTER PANE | MIDDLE PANE | INNER PANE | GAP SIZE | OVERALL |
| All | ⅛" | N/A | ⅛" | 0.516" | ¾" |
| | OUTER PANE | MIDDLE PANE | INNER PANE | | |
| All | Clear | N/A | Clear | | |
| | SPACER TYPE | PRIMARY SEAL | SECONDARY SEAL | CODE | |
| All | Lexan | Foam Tape | N/A | Other | |

Example 3—Pre-Formed Window and Insert Properties

TOTAL PRODUCT CALCULATIONS (Thermal Optic Insert)

| | | | Total Product Performance | | | | | |
|---|---|---|---|---|---|---|---|---|
| Option Number | Description | AERC Baseline Window Type | U-Value (BTU/h · ft² · F) | SHGC | VT | AL (cfm/ft²) | EPc | EPh |
| 1 | Double Glazed Interior Window Insert | BW-E | 0.34 | 0.51 | 0.52 | 0.01 | 30 | 96 |

Example 3—Multi-Pane Window Insert Assembly Performance

As illustrated by these examples, the multi-pane window assembly described herein exhibits significant improvements across all measurable attributes relative to a single or dual-pane glass window assembly.

The applications of the multi-pane window described herein is not limited to single windows alone. It can be applied to large window facings such as store fronts, insulating the entire window wall or display wall. The use of a retrofit window is an affordable, convenient, highly efficient way to insulate windows. Due to the light-weight construction, existing framing structures can be utilized for installation without additional architectural supports for the building which are required for traditional glass window installations. Installation is simple, quick and does not require demolition or construction. The multi-pane window can improve the comfort level of any office or building, reduce its energy consumption and save money.

As described with reference to FIGS. 5-8, according to some implementations, the multi-pane window includes a gasket comprised of a flexible material. The gasket being configured to provide a seal for the multi-pane window when installed in a window frame. According to some implementations, the gasket comprises a first protrusion on the exterior facing side, a second protrusion on the interior facing side, and a third protrusion between the first and second protrusions. According to some implementations, the first and second protrusions are elongated relative to the third protrusion.

According to some implementations, the second protrusion is elongated relative to the first protrusion. According to some implementations, the first, second and third protrusions are shaped as fins. According to some implementations, the first and second protrusions are shaped as fins and the third protrusion is shaped as a rounded nib.

According to some implementations, the gasket may be made of a synthetic rubber, such as ethylene propylene diene terpolymer (EPDM) rubber, allowing the gasket to be resistant to extreme heat and cold, steam, ozone and other weather conditions. According to some implementations, the gasket may have up to 85% memory retention. Because the gasket is open and breathable, it reduces condensation on the window surfaces. The color of the gasket can be matched to almost any color through an extrusion process.

The gaskets described herein may also be formed of other materials, such as rubber, BUNA-N, nitrile, Neoprene® 1, SBR, silicone, thermoplastic rubber (TPE), and flexible PVC, or other suitable materials.

Figure 7:
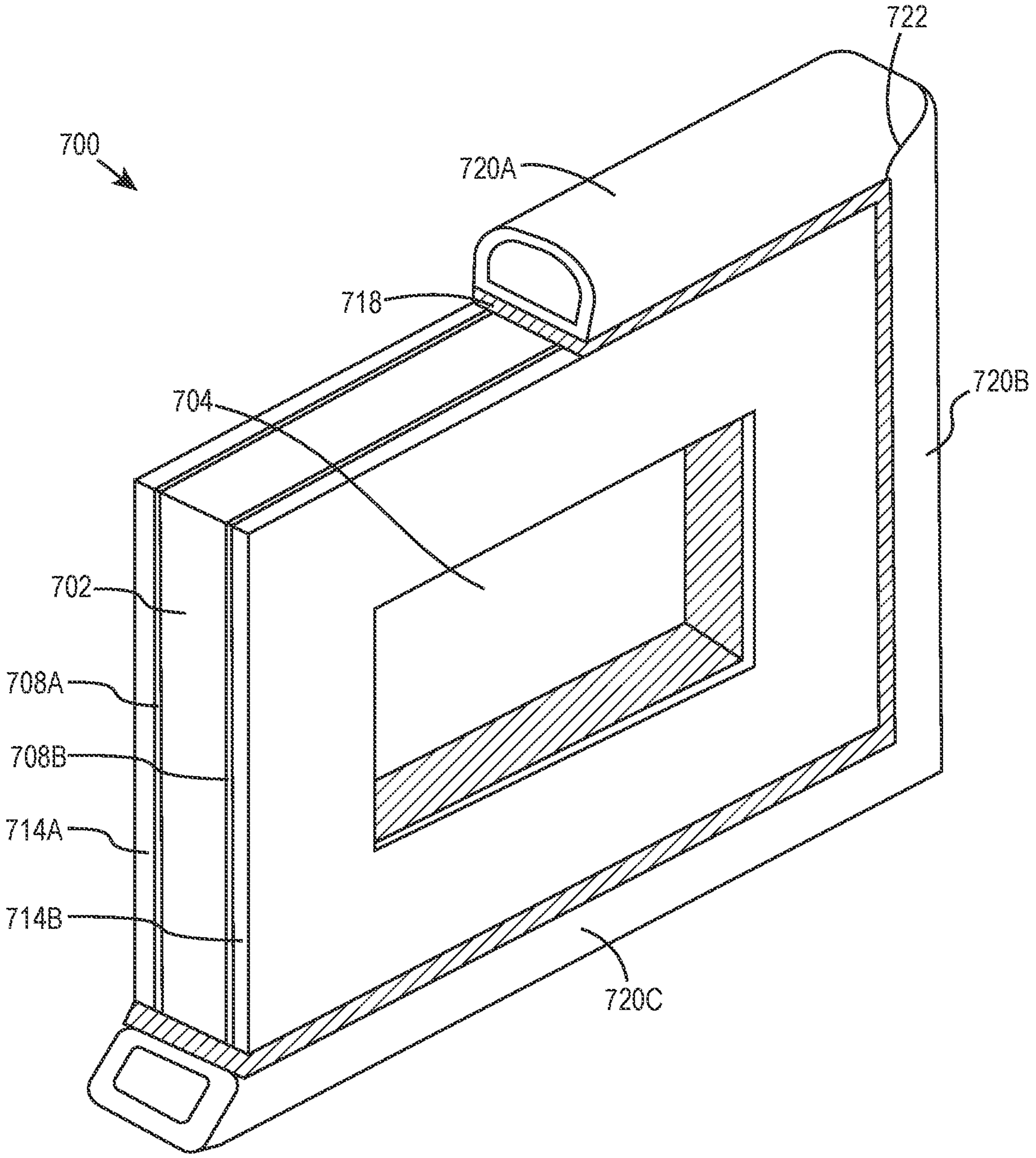
FIG. 7 illustrates a perspective view of a cross-section of the multi-pane window insert according to some implementations.

FIG. 7 illustrates a perspective view of a cross-section of the multi-pane window insert 700 according to some implementations. As shown in FIG. 7, the multi-pane window insert 700 includes a spacer frame (e.g., skeleton) 702 which defines the overall structure of the multi-pane window insert 700 and is configured to substantially conform to the measurements of the corresponding pre-formed window frame. A first polycarbonate pane 714A and a second polycarbonate pane 714B are adhered to opposing surfaces of the spacer frame 702 utilizing bonding agent 708A and 708B. In some implementations, the bonding agent 708A and 708B corresponds to high bond double sided adhesive tape. The first pane 714A and the second pane 714B are pressure rolled to ensure a tight bond with the spacer frame 702. The spacer frame 702 is provided only on the exterior perimeter of the multi-pane window 700 such that an air gap 704 is provided between the first pane 714A and the second pane 714B. Gaskets 720A-720C are adhered to the external surface of the multi-pane window insert 700 by way of bonding agent 718. In some implementations, bonding agent 718 corresponds to a high strength construction glue and the gaskets 720A-720C are pressure rolled to provide a strong bond. The gaskets 720A-720C are bonded together at matching cut angle corners 720. While not shown in the cross-section view, the gasket is provided on the four perimeter surfaces of the multi-pane window 700 to enable an air-tight seal when installed in the pre-existing window frame to form the multi-pane window assembly.

Figure 8A:
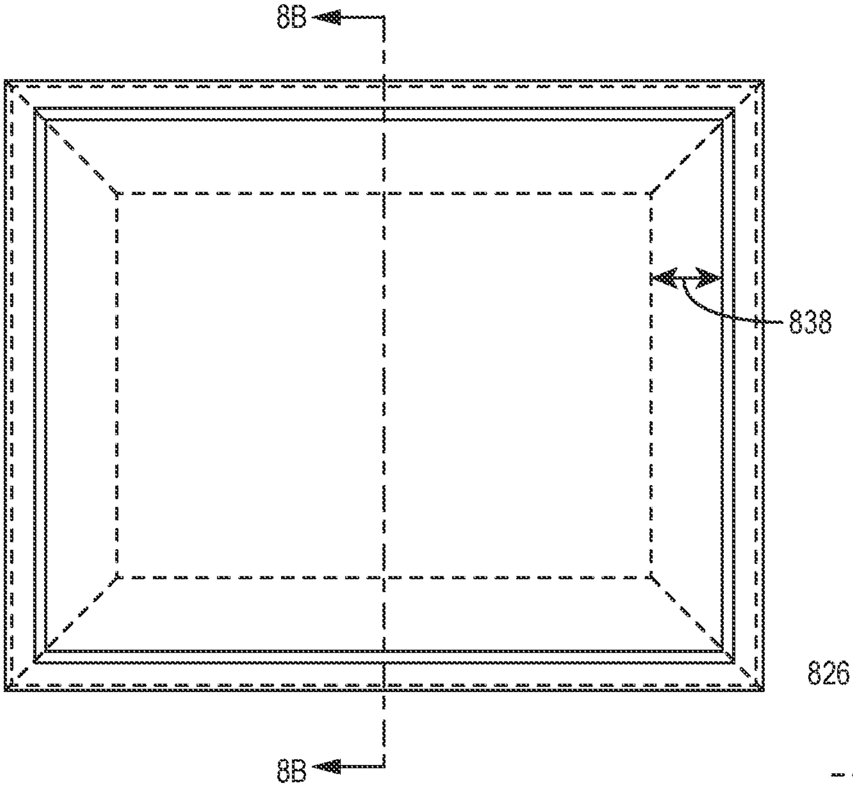
FIG. 8A illustrates a side view of the multi-pane window insert of FIG. 7.
Figure 8B:
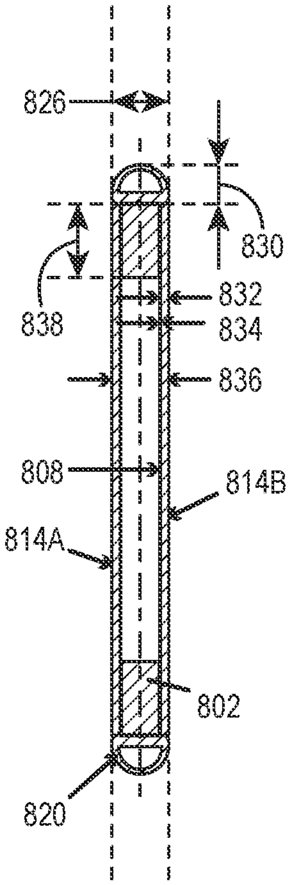
FIG. 8B illustrates a cross-section of the multi-pane window insert of FIG. 8A along lines 8B according to some implementations.

FIG. 8A illustrates a side view of the multi-pane window insert of FIG. 7. As shown in FIG. 8A, the spacer frame has a width 838 measured across the thickness of the multi-pane window insert which may be in the range of 0.5 to 1.5 inches. FIG. 8B illustrates a cross-section of the multi-pane window insert of FIG. 8A along lines 8B according to some implementations. As shown in FIG. 8B, the gasket 820 has a width 826 in the range of 0.5 inches to 1.5 inches and a height 830 in the range of 0.25 inches to 0.75 inches. According to some implementations, the width 826 of the gasket 820 is approximately 1-5% greater than the width 836 of the multi-pane window insert as measured from the edges of the first pane 814A and second pane 814B.

The first pane 814A and the second pane 814B may have a thickness 832 in the range of 0.1 to 0.4 inches, while the adhesive bonding the panes 814A, 814B to the spacer frame 802 may have a thickness of less than 0.03 inches. For ease of reference, the adhesive is illustrated across the entire height of the multi-pane window insert, but one of ordinary skill in the art will recognize that the adhesive may be applied only at the portions corresponding to the external surfaces of the spacer frame 802 to bond the panes 814A, 814B.

The dimensions described in FIGS. 8A-8B are for illustrative purposes only and are non-limiting examples of an implementation of the multi-pane window. One of ordinary skill in the art will recognize that the dimensions may be adapted according to the structure and requirements of a pre-formed window frame.

FIGS. 9A-9E illustrate example cross-section views of different gaskets for a multi-pane window installation according to various implementations. The gasket configurations illustrated in FIGS. 9A-9E may be utilized and modified accordingly for integration with any suitable sash or prefabrication window assembly.

Figure 9A:
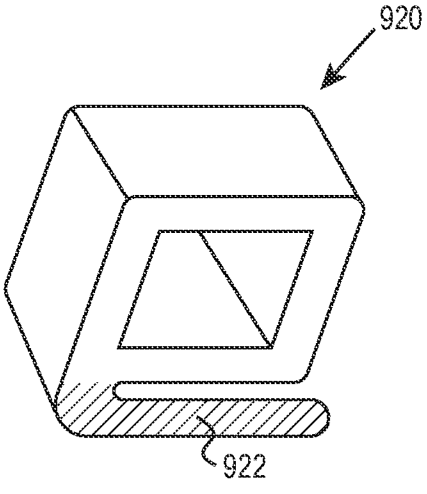
FIGS. 9A-9E illustrate example cross-section views of different gaskets for a multi-pane window installation according to various implementations.
Figure 9B:
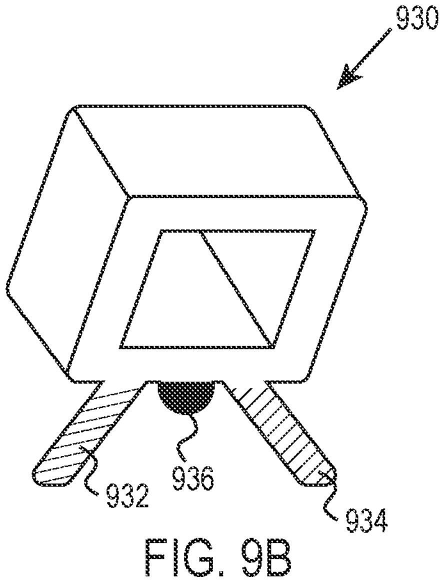
Figure 9C:
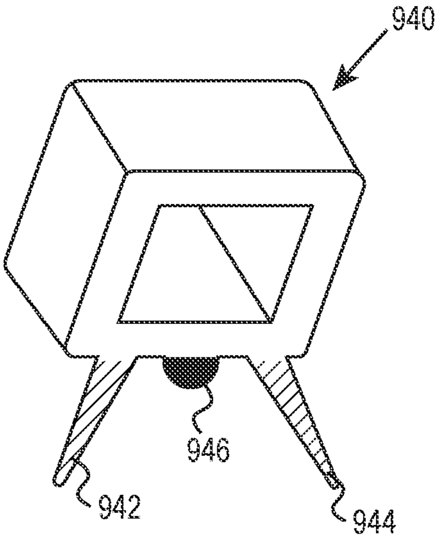
Figure 9D:
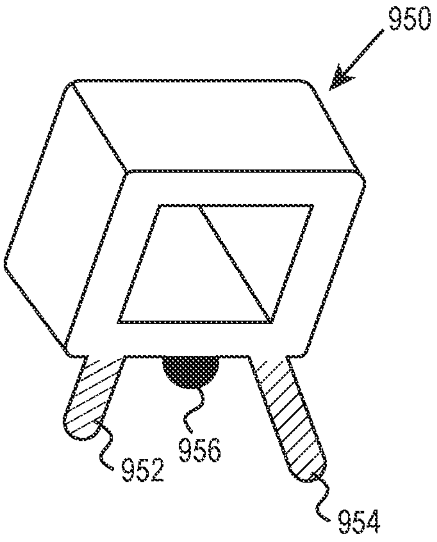

FIG. 9A illustrates an example of a cross-section gasket that is utilized in the example implementation illustrated with reference to FIGS. 5-6. As shown in FIG. 9A, the gasket 920 includes a single fin section 922 that is configured to allow for sealing of the multi-pane window upon installation into a window frame. FIG. 9B illustrates an example gasket 930 which includes plural protrusions for providing the sealing mechanism of the gasket 930. As shown, a first protrusion 932 and a second protrusion 934 are provided on opposite ends of the gasket 930. A central protrusion 936 is provided such that the first protrusion 932 and the second protrusion 934 are elongated relative to the central protrusion 936.

The extended protrusions of the gasket may be formed as fins or have rounded corners or have any variation therebetween. For example, with reference to FIG. 9C, gasket 940 includes a first fin 942 and a second fin 944 which may be provided on opposite ends with a rounded central protrusion 946 therebetween. The extensions on either end of the gasket 940 may be elongated relative to the central protrusion and/or relative to each other. For example, with reference to FIG. 9D, gasket 950 includes an extension 954 which may be elongated relative to both the central protrusion 956 and the extension 952. In some implementations, the longest protrusion is configured to be on the internal facing surface of a window insert, such that the shorter extension is provided on the external facing side of the window insert to provide for an easier installation while maintaining a proper seal. In each of FIGS. 9A-9D, the flat surface of the gaskets is configured to be adhered to the external perimeter of the multi-pane window inserts as described above. The gaskets are cut at angled or rounded corners in order to correspond to the perimeter of the multi-pane window insert. The flexible protrusions allow for an air-tight seal with the existing pre-formed window frame. The gasket configurations described above may also be provided as a prefabricated elastomeric gasket.

Figure 9E:
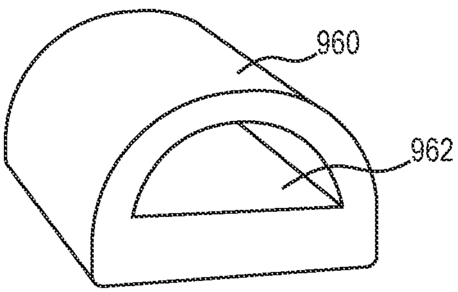

According to some implementations, for example as shown in FIGS. 7-8B, the gasket may be formed without elongated protrusions. For example, as shown in FIG. 9E, a gasket 960 may be formed with a flat surface and a convex surface defining a gap 962. The convex surface abuts the pre-formed window frame and flexes to flatten the gap 962 to adapt and provide the air-tight seal to the window frame.

In addition to the insulative properties described above, the multi-pane window disclosed exhibits an impact resistance benefit, for example against weather events or other impact. Additives and other sealant techniques may be utilized to enable a retrofitting installation of the multi-pane window.

Due to the high impact resistant nature of the multi-pane window, a quick release mechanism may be provided to enable removal of the multi-pane window insert described herein in emergency situations. For example, emergency responders may have a need to vent an area during a fire and would typically resort to breaking a glass window to the extent possible. In order to enable a corresponding safety/emergency release feature, a quick release mechanism may be provided during installation of the multi-pane window.

Since the gasket of the multi-pane window insert is of a flexible material, a hook or bar made of a rigid material can be utilized to effectively pry the multi-pane window insert away from the pre-formed frame in the event of an emergency or removal for replacement or cleaning. This feature is advantageous over other screw-in or permanently fastened type window inserts which cannot otherwise be readily removed. Due to the light-weight nature of the multi-pane window insert described herein, such permanent fastening mechanisms are not necessary to retain the multi-pane window insert in the pre-formed window frame. Rather, the multi-pane window insert is retained in the pre-formed window frame by the suction and friction force of the flexible gasket that pushed into place during the installation process. For example, due to the retrofit nature of the multi-pane window insert, the multi-pane window insert may be removed by way of a J-hook or other detachment bar that is capable of penetrating the area between the insert and the pre-formed window frame where the flexible gasket creates the seal.

In some implementations, the release mechanism may correspond to one or more pull straps that are fastened to the edges of the multi-pane window insert while maintaining the air-tight seal created by the gasket. These straps can be utilized to effectively uncouple the multi-pane window insert from the pre-formed frame.

In other implementations, the multi-pane window insert may be removably fastened to the pre-formed window frame utilizing snaps, velcro, or other removable fastening mechanisms. These fastening mechanisms may provide additional retention force to that provided by the coupling of the flexible gasket to the pre-formed window frame, while maintaining the removable capability of the multi-pane window insert.

Although this invention has been described in terms of certain implementations, other implementations that are apparent to those of ordinary skill in the art, including implementations that do not provide all the features and advantages set forth herein, are also within the scope of this invention. Moreover, the various implementations described above can be combined to provide further implementations. In addition, certain features shown in the context of one implementation can be incorporated into other implementations as well. Accordingly, the scope of the present invention is defined only by reference to the appended claims.

The invention claimed is:

1. A multi-pane window insert comprising:

a first pane and a second pane formed of polycarbonate resin thermoplastic material;

a spacer frame retaining and providing structural support for the first pane and the second pane, wherein the spacer frame separates the first pane from the second pane, wherein the spacer frame is formed of resin thermoplastic material, the spacer frame, first pane, and second pane defining an exterior perimeter surface, an interior facing side, and an exterior facing side; and a gasket comprised of a flexible material and formed on the exterior perimeter surface, the gasket comprising a flat surface adhered to the exterior perimeter surface, a second surface having a substantially convex shape defining a gap with the flat surface, and an elongated protrusion extending from the second surface on the interior facing side and being configured to provide an air-tight seal for the multi-pane window insert when installed in a preformed window frame, wherein the gasket is formed of a different material than the first pane, second pane, and the spacer frame;

wherein the multi-pane window insert is configured to be installed on an interior surface of the pre-formed window frame such that when the second surface of the gasket abuts the pre-formed window pane the gasket is flexed to flatten the gap to provide the air-tight seal.

2. The multi-pane window insert of claim 1, wherein the gasket further comprises a second protrusion extending from the second surface on the exterior facing side.

3. The multi-pane window insert of claim 1, wherein the protrusion is shaped as a fin.

4. The multi-pane window insert of claim 2, wherein the protrusion and the second protrusion are shaped as fins, and further comprising a third protrusion shaped as a rounded nib.

5. The multi-pane window insert of claim 1, wherein the gasket is comprised of a synthetic rubber.

6. The multi-pane window insert of claim 1, wherein the spacer frame is a clear polycarbonate.

7. The multi-pane window insert of claim 1, wherein the spacer frame is a color tinted polycarbonate.

8. A multi-pane window assembly comprising:

a multi-pane window having a plurality of glass panes and a preformed window frame; and a multi-pane window insert, the multi-pane window insert comprising:

a first pane and a second pane formed of polycarbonate resin thermoplastic material;

a spacer frame retaining and providing structural support for the first pane and the second pane, wherein the spacer frame separates the first pane from the second pane, wherein the spacer frame is formed of resin thermoplastic material, the spacer frame, first pane, and second pane defining an exterior perimeter surface, an interior facing side, and an exterior facing side; and a gasket comprised of a flexible material and formed on the exterior perimeter surface, the gasket comprising a flat surface adhered to the exterior perimeter surface, a second surface having a substantially convex shape defining a gap with the flat surface, and an elongated protrusion extending from the second surface on the interior facing side and being configured to provide an air-tight seal for the multi-pane window insert when installed in a preformed window frame, wherein the gasket is formed of a different material than the first pane, second pane, and the spacer frame;

wherein the multi-pane window insert is configured to be installed on an interior surface of the pre-formed window frame such that when the second surface of the gasket abuts the pre-formed window pane the gasket is flexed to flatten the gap to provide the air-tight seal.

9. The multi-pane window assembly of claim 8, wherein the gasket further comprises a second protrusion extending from the second surface on the exterior facing side.

10. The multi-pane window assembly of claim 8, wherein the protrusion is shaped as a fin.

11. The multi-pane window assembly of claim 9, wherein the protrusion and the second protrusion are shaped as fins, and further comprising a third protrusion shaped as a rounded nib.

12. The multi-pane window assembly of claim 8, wherein said gasket is comprised of a synthetic rubber.

13. The multi-pane window assembly of claim 8, wherein the spacer frame is a clear polycarbonate.

14. The multi-pane window assembly of claim 8, wherein the spacer frame is a color tinted polycarbonate.

* * * * *